H. P. ARNDT.
DEMOUNTABLE TRACTION RIM FOR AUTOMOBILE WHEELS.
APPLICATION FILED JUNE 4, 1917.
1,261,676.
Patented Apr. 2, 1918.
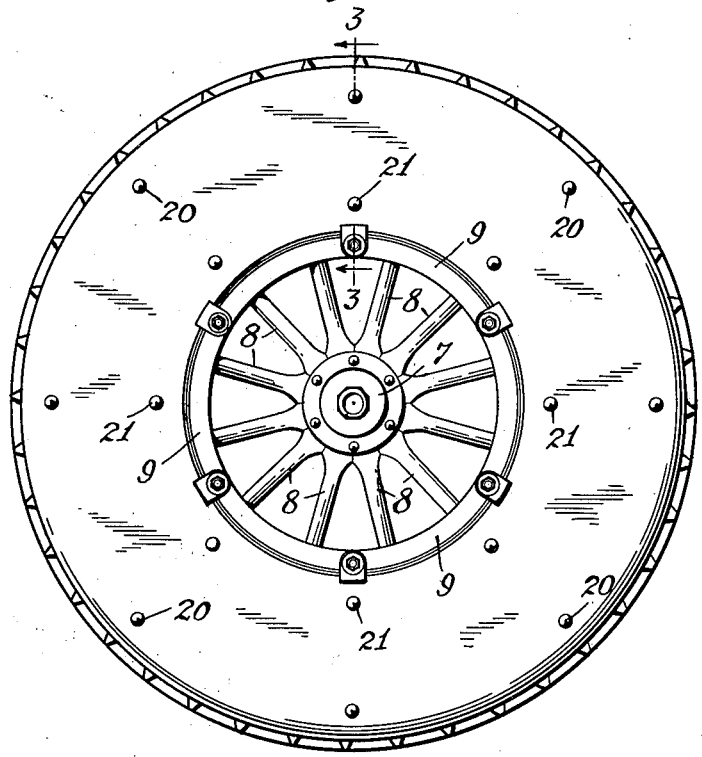
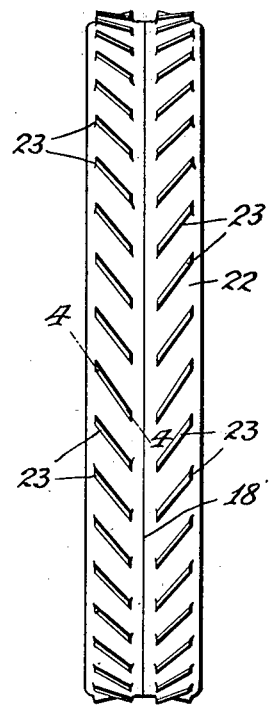
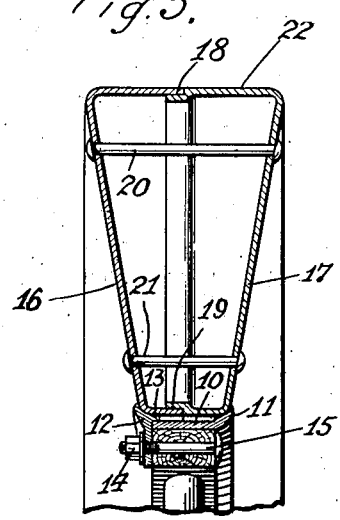
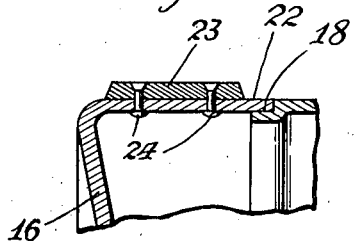
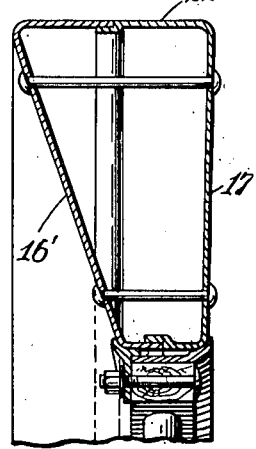
INVENTOR
Henry P. Arndt
BY
ATTORNEY

UNITED STATES PATENT OFFICE.

HENRY PAUL ARNDT, OF AMSTON, CONNECTICUT, ASSIGNOR OF TWO-THIRDS TO CHARLES M. AMS, OF NEW YORK, N. Y.

DEMOUNTABLE TRACTION-RIM FOR AUTOMOBILE-WHEELS.

1,261,676.   Specification of Letters Patent.   Patented Apr. 2, 1918.

Application filed June 4, 1917. Serial No. 172,829.

*To all whom it may concern:*

Be it known that I, HENRY P. ARNDT, a citizen of the United States, and a resident of Amston, county of Tolland, and State of Connecticut, have invented certain new and uesful Improvements in Demountable Traction-Rims for Automobile-Wheels, of which the following is a specification.

This invention relates generally to wheels for self-propelled vehicles, with more particular reference to wheels in connection with which what are known as traction tires, or rims provided with traction tires, may be quickly and readily substituted for the ordinary pneumatic or other cushion tires used in connection with road or pleasure vehicles, or for the rims in which said tires are mounted in wheels of the "demountable rim" type.

It is well known that the automobile is coming more and more into general use as a traction engine for farm and other analogous uses. In order to adapt the same vehicle for use in the field as a traction engine as well as for use on the road for the purposes of either pleasure or business—a double use now to a large extent insisted upon by farmers and residents of agricultural districts—the fact that pneumatic tires are utterly unsuitable for a traction engine designed to be used in the field, and the broad flat and generally cleated tires adapted for traction purposes are just as unsuitable on a vehicle designed for use on good roads for the purposes of pleasure or business, makes it essential, in providing for this double use, that interchangeable tires or rims be provided and such interchange be effected with the least possible trouble and inconvenience and in the shortest possible period of time.

I am well aware that at the present time there is nothing broadly new in a demountable tire-carrying rim *per se*, but in adapting an ordinary motor-vehicle wheel for use in the field, thus converting a pleasure car into a traction engine, problems are presented other than those involved in providing a wheel from which the tire may be readily and quickly removed when damaged or impaired for replacement by a sound tire of the same character and for the same purposes. For instance, the soft ground of a plowed field is not like the hard surface of a road, paved or otherwise, and is not adapted to properly sustain the ordinary automobile wheel, of comparatively small diameter and of much sharper angle of curvature. Therefore, to effect anything like the best results, a traction wheel should be of materially increased diameter, a fact which must be taken into consideration when interchangeable pneumatic and traction tires are provided. Furthermore, in providing a substitute rim and tire of such character as to insure the necessary or desirable increased diameter of wheel, particularly in conection with the driving wheels, account must be taken of the vastly increased tortional strain on the rim and its connections.

The principal object of the present invention is the provision of a traction rim and tire which, when mounted, will provide a complete wheel capable of satisfactorily performing all of the functions which a traction wheel is ordinarily called upon to perform, and which rim and tire are adapted to be quickly and readily substituted for a demountable rim and tire of any standard automobile wheel of the "demountable rim" type. Other objects of the invention will become apparent from the following specification, reference being had to the accompanying drawings, forming a part thereof, in which I have illustrated a practical and convenient embodiment of my invention, and in which—

Figure 1 is a side elevation of a wheel equipped with a demountable traction rim and tire embodying my invention;

Fig. 2 is an edge view thereof;

Fig. 3 is an enlarged transverse section taken substantially on the line 3—3 of Fig. 1;

Fig. 4 is a fragmentary sectional view taken substantially on the line 4—4 of Fig. 2, and Fig. 5 is a view similar to Fig. 3, showing a modification of the preferred form of my improved traction rim and tire.

Referring now, to the drawings in detail, in which I have shown an automobile wheel of the "artillery" type, numeral 7 designates the hub, 8 8 the spokes and 9 9 the wooden fellies of the wheel. Shrunk or otherwise suitably secured upon the fellies 9 9 in any well-known and approved manner is the felly-band 10, having the inside edge 11 thereof flanged or turned up at an angle to engage one side of the usual tire-carrying rim, the other side of which is engaged, to lock said rim in place, by the locking ring 12 which is bolted to the fellies and which is provided with the inwardly projecting flange 13 engaging the felly-band 10. A wheel such as that described above exemplifies a common and well-known type of "demountable rim" construction, the tire-carrying rim being firmly and rigidly locked in the seat provided by the upwardly projecting edges of the parts 10 and 12, whereby said rim may be readily removed by unscrewing the nut 14 of the bolt 15 and then withdrawing the part 12.

A preferred form of traction rim, or, more properly well adapted for use in connection with a wheel such as that just described, and which may be interchangeably used in connection with the ordinary tire-carrying rim for pneumatic tires, comprises an annular and preferably two-part frame of sheet-metal, the interior circular face of which substantially conforms in configuration to the ordinary tire-carrying rim, whereby the former may be similarly seated and locked between the up-turned edges of the felly-band 10 and the locking ring 12. As suggested, I prefer that this rim should comprise the two-parts 16 and 17, constructed to overlap at the meeting edges 18 and 19 thereof and rigidly held together by means of the rivets 20 and 21. These parts when assembled form a unitary structure which flares outwardly, as clearly shown in Fig. 3, to form the relatively wide tread portion 22, which I prefer to provide with anti-slipping cleats or lugs 23, of metal, wood, rubber or other suitable material, secured to the tread or tire portion 22 of the rim by means of rivets 24 (Fig. 4) or in such other approved manner as may be desired.

In spite of the fact that in increasing the diameter of the wheel I have materially increased the leverage at the union or connection between my traction rim and the rim-engaging means, and therefore materially augmented the forces resisting rotation of the tire which tend to cause the same to slip upon the felly-band, I have found that the wedging and gripping effect of the parts 10 and 12 under action of the bolts 15, is amply sufficient to retain the rim in rigid engagement under any ordinary conditions of use.

In some makes of cars, there is hardly sufficient clearance between the driving wheels and the body or chassis of the car to permit of mounting on the wheels of tires which are—or the tread portions of which are— of the desired width for traction purposes. In such case, my traction rim may readily be given a form such as that illustrated in Fig. 5, wherein I have shown the part 17' providing a substantially vertical wall and the part 16' providing a side wall having a greater angle of inclination than that of the corresponding part in the preferred construction, whereby the tread portion 22' may be of the desired width without projecting inwardly in the direction of the body or chassis of the car. Apart from the above, the construction shown in Fig. 5 is to all intents and purposes substantially the same as that illustrated in Fig. 3.

From the foregoing, it will be apparent that I have not only provided a traction tire adapted to be used interchangeably with an ordinary demountable tire-carrying rim, but have provided for the desirable increased diameter of wheel and have given to the entire wheel structure, whether an ordinary tire-carrying rim or a combined traction rim and tire is employed, the stability and rigidity essential to the purposes for which it is designed to be employed.

Other modifications of minor details of my improved demountable traction rim for automobile wheels will doubtless readily suggest themselves to those skilled in the art to which it appertains, and I therefore do not desire to limit my invention to this specific construction herein shown and described.

I claim as new and desire to secure by Letters Patent:

1. In a wheel, the combination with a felly-band and means associated therewith for detachably engaging and retaining thereon a demountable tire-carrying rim for pneumatic tires, of a combined traction rim and tire comprising a unitary annular frame having a relatively wide periphery or tread portion and a relatively narrow inner or rim portion adapted to be engaged and secured by said engaging and retaining means.

2. In a wheel, the combination with a felly-band and means associated therewith for detachably engaging and retaining thereon a demountable tire-carrying rim for pneumatic tires, of a combined traction rim and tire comprising a hollow unitary annular frame having a relatively wide periphery or tread portion and tapering inwardly to a relatively narrow inner or rim portion adapted to be engaged and secured by said engaging and retaining means.

3. In a wheel, the combination with a felly-band and means associated therewith for detachably engaging and retaining thereon a demountable tire-carrying rim for pneumatic tires, of a combined traction rim and tire comprising a hollow unitary annular frame made up of two interfitting parts and means for retaining said parts in assembled and interfitting relation, said frame having a relatively wide periphery or tread portion and tapering inwardly to a relatively narrow inner or rim portion adapted to be engaged and secured by said engaging and retaining means.

In testimony of the foregoing, I have hereunto set my hand in the presence of two witnesses.

HENRY PAUL ARNDT.

Witnesses:
GEORGE VOELK,
HARRY L. SIMON.